(12) United States Patent
Liang et al.

(10) Patent No.: US 8,594,318 B2
(45) Date of Patent: Nov. 26, 2013

(54) METHOD AND APPARATUS FOR INDICATING A CALLER'S INTENT

(76) Inventors: Bessy Wen-Han Liang, Cupertino, CA (US); Alice Wen-Chi Liang, Cupertino, CA (US); Anna P. Liang, Cupertino, CA (US); Barry C. Liang, Cupertino, CA (US)

( * ) Notice: Subject to any disclaimer, the term of this patent is extended or adjusted under 35 U.S.C. 154(b) by 1068 days.

(21) Appl. No.: 11/562,922

(22) Filed: Nov. 22, 2006

(65) Prior Publication Data

US 2007/0121860 A1    May 31, 2007

Related U.S. Application Data

(60) Provisional application No. 60/739,549, filed on Nov. 23, 2005.

(30) Foreign Application Priority Data

May 22, 2006  (CN) .......................... 2006 1 0020860

(51) Int. Cl.
   *H04M 3/00* (2006.01)
(52) U.S. Cl.
   USPC ............ 379/373.03; 379/374.01; 379/374.02; 379/374.03; 379/375.01; 379/376.01

(58) Field of Classification Search
   USPC .......................... 379/373.03, 373.01–376.02
   See application file for complete search history.

(56) References Cited

U.S. PATENT DOCUMENTS

| | | | |
|---|---|---|---|
| 6,704,395 B1 * | 3/2004 | Borland et al. | 379/67.1 |
| 6,826,173 B1 * | 11/2004 | Kung et al. | 370/352 |
| 6,947,533 B2 | 9/2005 | Okamura et al. | |
| 2002/0077102 A1 * | 6/2002 | Achuthan et al. | 455/435 |
| 2002/0163999 A1 * | 11/2002 | Farris et al. | 379/88.02 |
| 2003/0011538 A1 * | 1/2003 | Lys et al. | 345/39 |
| 2003/0190025 A1 | 10/2003 | Okamura et al. | |
| 2005/0031112 A1 * | 2/2005 | Bezner et al. | 379/211.02 |
| 2005/0232253 A1 * | 10/2005 | Ying et al. | 370/356 |
| 2006/0045252 A1 * | 3/2006 | Gorti et al. | 379/201.02 |

FOREIGN PATENT DOCUMENTS

CN     1380785 A    11/2002

* cited by examiner

*Primary Examiner* — Duc Nguyen
*Assistant Examiner* — Ibraham Sharifzadeh

(57) ABSTRACT

When a number of users share one telephone number, the present invention indicates who the callee (the person the caller wants to talk to) is, with personalized rings and information shown on a display, so as to allow each user to quickly identify calls directed to him/her. A mobile phone user could inform the callee his/her intent and/or the urgency level of the call by selecting from options provided by the callee reflecting the callee's preferences.

31 Claims, 4 Drawing Sheets

METHOD AND APPARATUS FOR INDICATING A CALLER'S INTENT

This application claims the benefit of U.S. Provisional Application No. 60/739,549, filed Nov. 23, 2005. The present application incorporates by reference the entire disclosure of that application. This application also claims the benefit of Chinese Patent Application No. 200610020860.7, filed May 22, 2006.

BACKGROUND OF THE INVENTION

A. Field of the Invention

The present invention relates to telecommunication, and more specifically to a CID (Calling Identity Delivery, Caller Identity Information) method and apparatus for indicating a caller's intent. The method and apparatus of the present invention could be used in fixed-line phones, mobile phones and wireless phones or answering machines.

B. Description of Related Art

Published Chinese Patent Application No. CN03104516 (Inventor: Koji Okamura) describes a system that presents on a display device caller's information including the caller's name.

Published Chinese Patent Application No. CN01110480 (Inventor: Ruiguang Wu) describes a microprocessor that compares the caller's phone number with phone numbers stored in a memory device. When a phone number stored in the memory device matches the caller's phone number, an audio device outputs identification audio signals corresponding to the stored phone number.

The inventions described in these patent applications present to a user the caller's phone number, calling time, and name or identification audio signal when a caller's phone number matches a previously stored phone number. However, if a caller's phone number is not previously stored, the prior art only displays the caller's phone number and calling time.

If a family goes out of town for a few days, they may have dozens of incoming calls waiting for them on their return. Usually, each family member can only reply to calls from phone numbers with which they are familiar, and ignore unfamiliar phone numbers. This not only may cause failure or delay of receipt of important information, but also may cause misunderstanding. In addition, when it is inconvenient for a mobile phone user to answer a phone call immediately, e.g., when he/she is sleeping or in a meeting, the prior art system cannot inform the user that a call is urgent and he/she must answer it immediately.

SUMMARY OF THE INVENTION

The present invention provides a CID method and apparatus for communicating a caller's intent, and has successfully overcome the shortcoming of the prior art.

When a number of users share one telephone number, the present invention can indicate who the callee (the person the caller wants to talk to) is, and allow each user to quickly look for calls directed to him/her. In addition, each user only needs to listen to messages to him/her, and can ignore messages to other users.

A mobile phone user could inform the callee his/her intent and/or the urgency level of the call by selecting from options provided by the callee reflecting the callee's preferences. Icons, codes, vibrations with at least two different frequencies, and caller phone numbers are classified to allow the callee to browse through and process the calls quickly and answer the calls according to their urgency level.

The method and apparatus of the present invention could be used in fixed-line phones, mobile phones, wireless phones, or answering machines.

DETAILED DESCRIPTION

Figure 1:
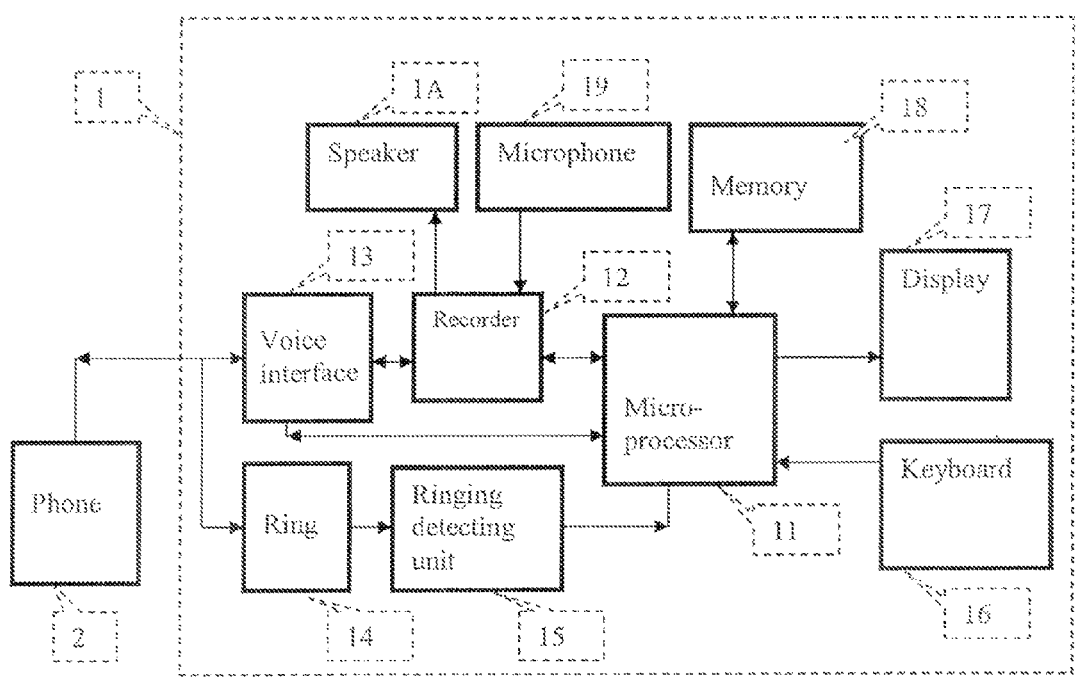
FIG. 1 illustrates a caller intent indicating device according to one embodiment of the present invention.

The purpose of the invention is achieved by following measures. For fixed-line telephones, as shown in FIG. 1, a caller intent indicating device 1 includes a microprocessor 11, a recorder 12, a voice interface 13, a ring 14, a ringing detecting unit 15, a keyboard 16, a display 17, a memory 18, a microphone 19, and a speaker 1A. The caller intent indicating device is coupled between a telephone 2 and a telephone network.

By key or microphone, each phone (including fixed-line and mobile phones) can set or record callee attribute data reflecting a callee's preferences.

The voice interface 13 is a gateway for signal transfer between the caller intent indicating device 1 and the phone 2, and between the caller intent indicating device 1 and an Exchange in the telephone network. It is the channel for recording and replaying voice signals to and from the device 1. The voice interface 13 transforms signals from the telephone line into signals receivable by the recorder 12 and the microprocessor 11, transforms signals from the recorder 12 and the microprocessor 11 into signals compatible with the telephone network, and separates the caller intent indicating device 1 and the telephone network to insure their respective circuit safety.

The microprocessor 11 controls the operation of the device 1. It controls the recorder 12 to record and replay greetings-to-caller 34, messages-to-callee 35 and instructions-to-caller 36 shown in FIG. 3; to play the present, the previous or the next message; and to pause the message playing. It also controls deletion of present message or all saved messages.

Figure 3:
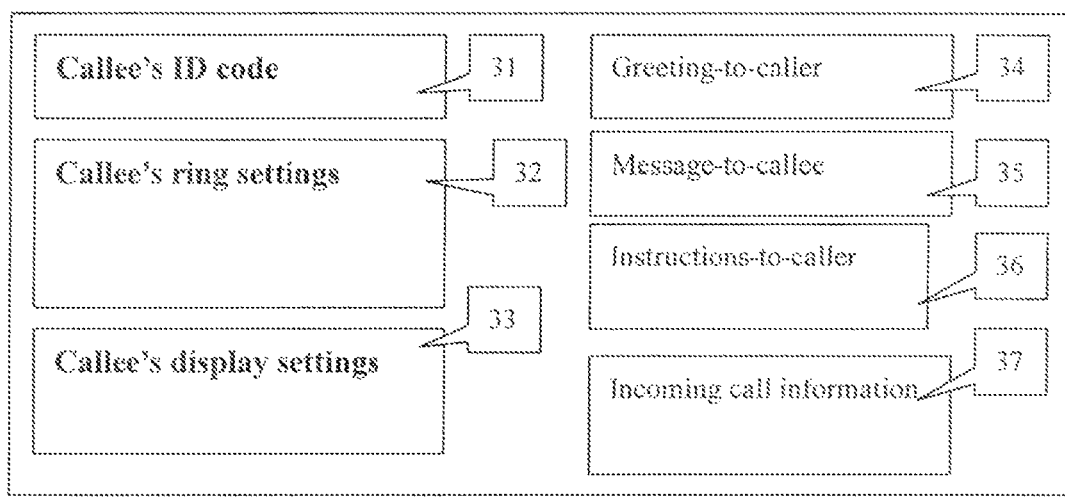
FIG. 3 illustrates a callee attribute data structure according to one embodiment of the present invention.

The microprocessor 11 controls the speaker 1A to output messages-to-callee 35 and previously recorded greetings-to-caller 36 shown in FIG. 3, and controls the ring 14 to play personalized rings of the callee. The microprocessor 11 is a microcontroller designed to process voice and music signals. With the help of the 8-bit microprocessor and other hardware, the microprocessor 11 can process voice and music signals in 8 channels simultaneously, and can support multiple of voice signal modulation formats, e.g., ADPCM/MDPCM/PCM. The sampling rates of voice channels are programmable, and the music channels could imitate characteristics of musical instruments.

The microprocessor 11 includes a DTMF (Dual-Tone Multi-Frequency) signal generator, a watchdog, an 8-bit timer/counter, a ring detection module, a Caller ID control module, etc., and is the control center of the whole circuit. Signals related to the control of the microprocessor 11 include a reset signal, a battery charging control signal, the ring detect signal (RDET), data signals, etc.

DTMF uses two different voice frequency signals to represent a number. When a key on the keyboard of a phone is pressed, it sends out a voice signal mixed from the two voice frequency signals. A DTMF signal generator in the microprocessor 11 generates the DTMF signal.

The recorder 12 could record and playback voice signals for a long time. It is controlled by the microprocessor 11, and sends its status back to the microprocessor. The display 17 shows a caller's phone number, date, time, etc. The display 17 also shows the callee's information, including callee's personalized image and code. The display 17 could be an LCD, e.g., a 32×4 LCD drive. Data is sent to the display 17 from a display buffer. The keyboard 16 receives user inputs for recording, replaying, or deleting audio signals, for ring and display settings, and for mode settings. The ringing detecting unit 15 sends the ring detect signal RDET (low level pulses) to a pin of the microprocessor 11. The memory 18 stores incoming call information and callee attribute data.

All parts of the caller intent indicating device 1 are synchronized by a real time clock, which in one embodiment is a 32.768 kHz crystal oscillator.

The caller intent indicating device 1 could send and receive voice, FSK or DTMF signals etc. Voice signal processing circuits, the ring 14 and the ringing detecting unit 15 in device 1 comply with Bell 202, and CCITT V. 1200 bps FSK data transmitting standard.

Figure 2:
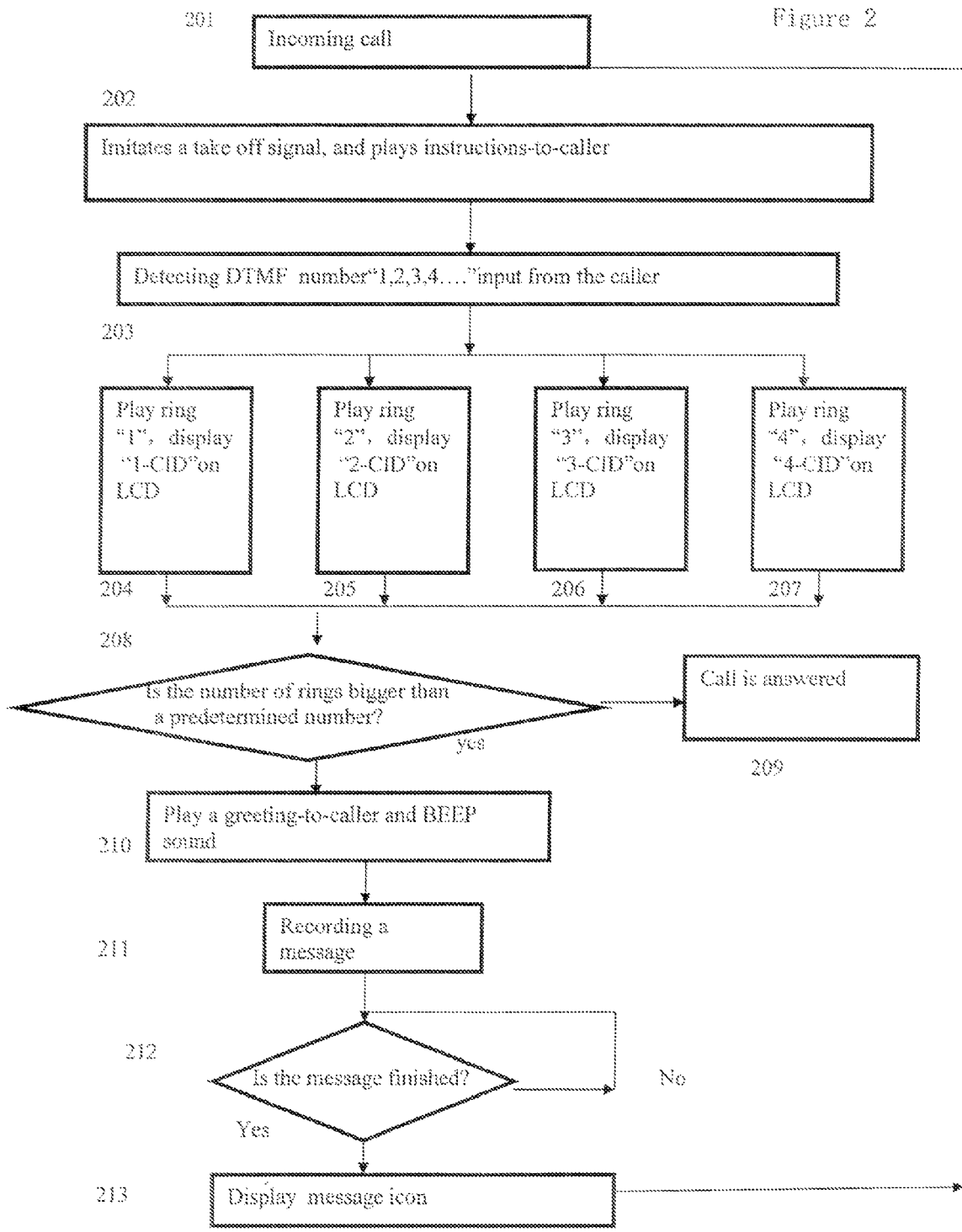
FIG. 2 illustrates a flow chart of a software program controlling the operation of the caller intent indicating device according to one embodiment of the present invention.

FIG. 2 illustrates a flow chart of a software program for controlling the operation of the caller intent indicating device according to one embodiment of the present invention.

The method of the present invention includes following steps.

At 201, ringing signals from a caller are sent to the caller intent indicating device 1. The ringing detecting unit 15 receives the ringing signals and sends the ring detect signal RDET to the microprocessor 11, notifying the microprocessor 11 that there is an incoming call.

At step 202, the caller intent indicating device 1 imitates an OFF HOOK signal and answers the call. The caller intent indicating device 1 sends to the Exchange the imitated OFF HOOK signal. The caller intent indicating device 1 plays previously stored instructions-to-caller 36 by the recorder 12, sending a list of options to the caller. One example of the options is: "For user A, please press 1; for user B, please press 2; ,,, for user X, please press n." The caller presses a key on his/her phone to choose the callee. The caller's input is sent to the caller intent indicating device 1 over the telephone line.

At 203, the caller intent indicating device 1 receives the caller's input, and stores the caller's input as a callee's ID code 31 in FIG. 3. According to the callee's ID code 31, the microprocessor 11 looks for the callee attribute data 3 for this particular callee in a callee attribute data structure 3 shown in FIG. 3.

At 204, 205, 206, and 207, the microprocessor 11 controls the ring 14 to play rings according to callee's ring settings 32, and control the display 17 to show callee's identification information according to callee's display settings 33. As discussed below with reference to FIG. 3, callee's ring settings 32 and callee's display settings 33 are previously set by the callee.

At 208, if the callee picks up the phone before the number of rings reach a predetermined number, the caller and the callee can start talking to each other at 209. If at 208, the call is not answered before the number of rings reaches the predetermine number, the device 1 plays a greeting-to-caller 34 and a beep sound at 210, asking the caller to leave a message.

At 211, 212, and 213, the recorder 12 receives and records the message-to-callee 35.

FIG. 3 illustrates the structure of callee attribute data according to one embodiment of the present invention.

The caller intent indicating device 1 maintenances a callee attribute data for each of a number of callees. The callee attribute data 3 includes: callee's ID code 31 (e.g., name, urgency level of the call, or department), callee's ring settings 32 (e.g., ring tones, music, vibrations at different frequencies or voice), callee's display settings 33 (e.g., icon, text, code, picture or cartoon), instructions-to-caller 36, message-to-callee 35, a greeting-to-caller 34, and incoming call information (e.g., data, time). The callee attribute data 3 is stored in the memory 18. It should be understood that the voice signals of the instructions-to-caller 36, message-to-callee 35, and greeting-to-caller 34 could be stored at the recorder 12, with a code representing the message or instructions saved at the memory 18.

In one embodiment, the attribute data of one callee is stored as one data record, separated from attribute data of other callees, so it is convenient for users to personalize the settings. For example, a user could conveniently record and play personalized greeting-to-caller 34, instructions-to-caller 36, callee's ring settings 32, and callee's display settings 33.

Personalized display includes but not limited to code, icon, image, picture, or cartoon. Personalized rings include but not limit to music, voice, chirps, vibrations at various frequencies, or the combination thereof. Different combinations of length and rhythm of the ringing signals may represent the urgency level or subject of the call. For example, when the call is urgent, the caller may select a high frequency vibration. Different personalized images and ringing signals are used to indicate the caller's intent, so that the callee can be informed.

Two embodiments of the present invention are described below.

1. A Fixed-line Phone

One method for indicating the caller intent is used with a fixed-line phone, and includes the following steps.

The originating Exchange sends the caller's phone number and other information to the caller intent indicating device 1 through the Interexchange Signaling System.

The destination Exchange sends the caller's identification information to the caller intent indicating device 1 by FSK (Frequency Shift Keying). Specifically, the destination Exchange sends logic "1"=1200±12 Hz, "0"=2200±22 Hz, 1200 bps baud rate FSK signal to the voice interface 13, which transforms the received signal to a signal suitable for being processed by the microprocessor 11. The microprocessor 11 then demodulates the signal into a serial asynchronous binary data.

The microprocessor 11 stores the incoming call information, including the caller identification information and the calling time, in the memory 18.

The microprocessor 11 has three states: power down, idle and normal operation. Usually the microprocessor 11 is in the power down state, and the power consumption is very low. When a first ring comes in, the microprocessor 11 enters into the normal operation state. Between the first and second ring, the microprocessor 11 demodulates the binary incoming call information. The microprocessor 11 receives and stores the incoming call information and displays it on the LCD 17, then the microprocessor 11 enters into the idle state. If there is no input for more than a predetermined period of time, e.g., 1 minute, from the beginning of the idle state, the microprocessor 11 will enter into the power down state.

When there is an incoming call, the microprocessor 11 starts to receive and store the incoming call information. The microprocessor 11 receives the ringing signal, sends to the caller an imitated OFF HOOK signal, and plays previously recorded instructions-to-caller 36, asking the caller to make a choice according to his/her intent. One example of the instructions-to-caller 36 is: "For user A, please press 1; for user B, please press 2; ,,, for user X, please press n." The microprocessor 11 then waits for a DTMF signals from the caller.

After detecting the DTMF signal "1, 2, 3, 4 . . . " from the caller indicating the caller's intent, the microprocessor 11 uses the received DTMF signal as the callee's ID code 31 to search the callee attribute data and selects a ring signal according to the callee's ring settings. The microprocessor 11 controls the ring 14 to play the selected ring signal, and the counter in the microprocessor 11 starts to count the number of the rings. The caller intent information "X-CID" is displayed on the LCD 17, wherein "X" represents the callee's identification information, and "CID" is the Caller ID information, which could be the caller's phone number or name. If the number of rings is smaller than a preset number, e.g., 6 or 12 or 18, then the microprocessor continues to wait for an OFF HOOK signal. If the callee picks up the phone, the microprocessor 11 turns on the voice interface 13. The voice signal from the telephone line enters into the telephone, and the caller and callee could talk to each other.

If the number of rings is bigger than the preset number, the microprocessor 11 plays a previously stored greeting-to-caller 34, asking to caller to leave a message, and then enters the automatic message recording state. The message is recorded as a message-to-callee 35.

With the hardware shown in FIG. 1, the flow chart shown in FIG. 2, and the callee attribute data structure shown in FIG. 3, the present invention has effectively solved the problems of the prior art.

Briefly, when a caller dials a phone number, the microprocessor 11 of the caller intent indicating device 1 associated with the phone number receives the ringing signal, imitates an OFF HOOK signal, plays a previously recorded instructions-to-caller 36 to ask the caller to select from a list of options, and then waits for the DTMF signal. The instructions-to-caller could be, for example: "For user A, please press 1; for user B, please press 2; ,,, for user X, please press n." The caller will then press a key on his/her phone to select the callee. After detecting the DTMF signal "1, 2, 3, 4 . . . " from the caller, the microprocessor 11 searches the callee attribute data shown in FIG. 3 for a callee matching the caller's input. For example, when the callee is A, the microprocessor 11 selects from a number of ring signals previously stored in a ROM the ring tone or vibration frequency corresponding to the ring setting 32 of user A. The microprocessor 11 also selects a display signal corresponding to the display settings of user A. The microprocessor 11 then control the ring 14 to output the selected ring signal. Meanwhile, the microprocessor controls the display 17 to show "X-CID". "X" represents the identification information of user A, it could be a number, or an icon or a picture or a few words previously stored by the user A. The information about the incoming call is then received and stored. If the call is not answered within a predetermined number of rings, the microprocessor 11 controls the recorder 12 to play the greeting-to-caller 34 previously stored by the user A and records a message from the caller.

Thus, the caller intent indicating device 1 not only stores and displays information about incoming calls, but also displays information of the callee, plays the callee's greeting-to-caller 34, and stores information of incoming calls and message-to-callee 35 for each callee. When browsing through the stored incoming call information and messages, a user of the telephone does not have to go through incoming call information and messages directed to other users in detail.

2. Mobile Phone

Figure 4:
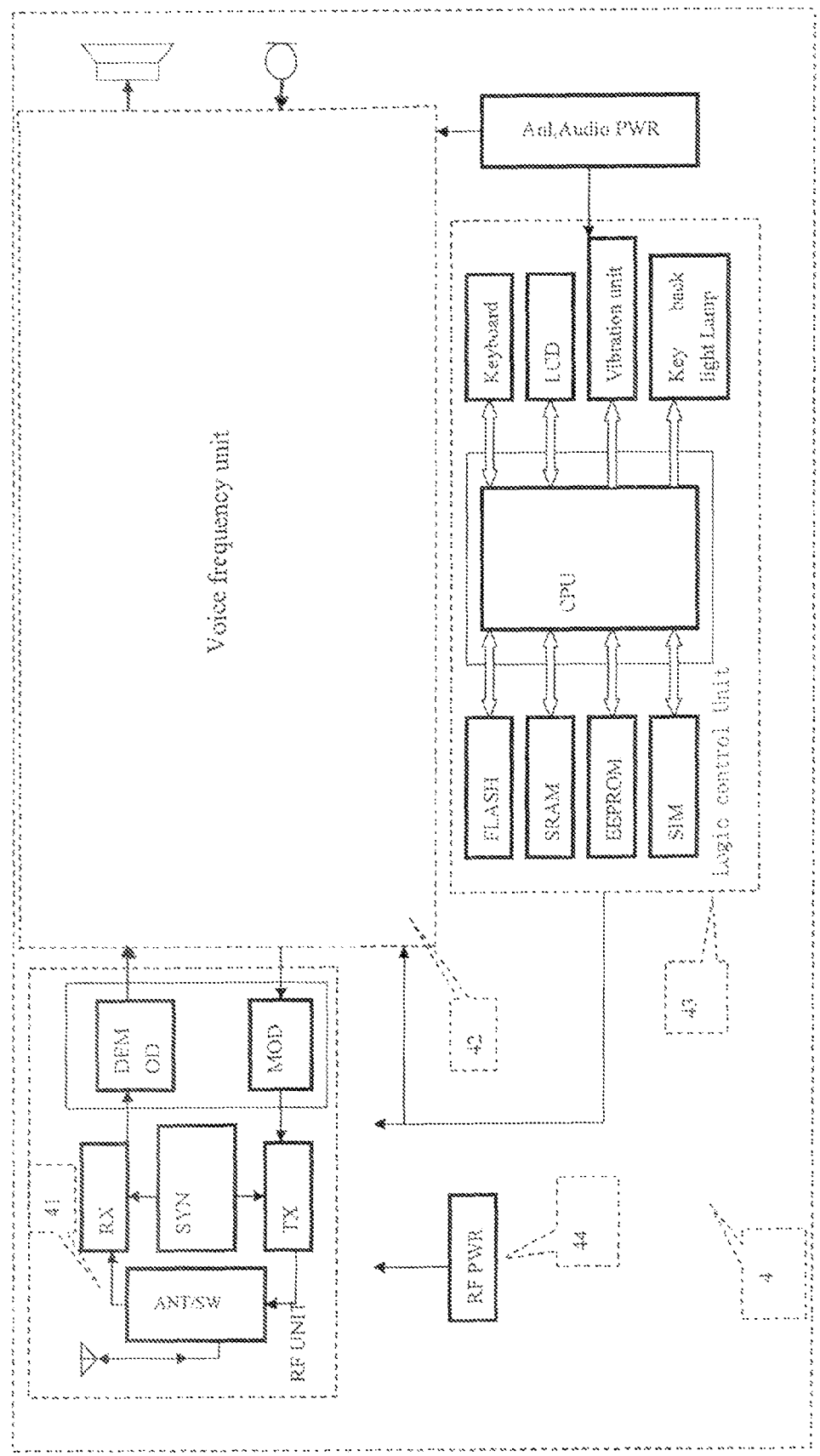
FIG. 4 illustrates a block diagram of a mobile phone employing the method for indicating caller's intent according to one embodiment of the present invention.

FIG. 4 shows a block diagram of a mobile phone employing the method for indicating caller's intent according to one embodiment of the present invention.

A mobile phone 4 mainly includes an RF unit 41, a voice frequency unit 42, a logic control unit 43, and an RF power supply unit 44. Wireless telecommunication is carried out between the mobile phone 4 and a base station via high frequency modulation signal. The callee attribute data structure stored in an EEPROM of the mobile phone 4 is shown in FIG. 3. The software program for controlling the caller intent indicating process stored in a FLASH is shown in FIG. 2.

The Radio Frequency unit 41 includes a receiver, a transmitter, a frequency synthesizer, an antenna, etc. The receiver down converts the frequency of the RF signal, and outputs a 67.707 KHZ base band signal (RXI, RXQ). Through TXI/Q (Cophase/quadrature) modulation, the transmitter starts at a higher frequency. It converts a 67.707 KHZ analog base band signal up to an 880 MHZ-915 MHZ (GSM900 band), or a 1710 MHZ-1785 MHZ (DCS1800 band) transmission signal. The signal is transmitted from the antenna after amplification. The frequency synthesizer supplies the base and carrier frequency to a frequency Mixer in the receiver and a modulation circuit in the transmitter respectively. The frequency synthesizer is controlled by the CPU of the logic control unit 43 and the voice frequency unit 42, and switches between frequencies automatically.

The logic control unit 43 and voice frequency unit 42 are controlled by the CPU to process and transmit voice signals.

The voice frequency unit 42 is divided into a receiving voice frequency signal processing branch and a transmitting voice frequency signal processing branch, and includes a modem (or DSP), a voice Coder/Decoder, and a PCM Coder/Decoder.

While the mobile phone is receiving a signal, the receiving branch demodulates (GMSK) the analog base band signal from the RF unit (A/D conversion), and decrypts the signal. A 13 Kb/s data flow is obtained after channel decoding, and a 64 Kb/s digital signal is obtained after voice decoding. An analogue voice signal obtained after PCM decoding is sent to a speaker.

While the mobile phone is transmitting a signal, analog signal from a microphone is converted to 64 Kb/s digital signal via PCM coding. A 67.707 kHz analog base-band signal, obtained after voice coding, PCM coding, encrypting, interweaving, and GMSK modulation, is sent to modulation circuit of the RF unit for radio frequency transformation.

The logic control unit 43 controls the operation of each part of the mobile phone, including, the RF unit, the voice frequency unit, the keyboard, the display, etc. The logic control unit 43 includes a CPU, memories, buses, etc.

There are two types of memory: data memory and program memory. Data memory, namely Static Random Access Memory (SRAM), is used as data buffer area to store intermediate data generated during program execution. Data stored in the data memory will be lost if the mobile phone is powered off. Program memory mainly contains two parts: Electrically Erasable Programmable Read-only Memory (EEPROM) and flash read only memory (FLASHROM). FLASHROM is used to store the basic program and all kinds function program of the mobile telephone, including the program shown in FIG. 2. It also stores font library and other types of data.

EEPROM has system control instructions and other data originally stored in the factory. The stored data could be automatically refreshed during operation of the mobile phone. A user could change the stored data via the keyboard too. EEPROM stores the menu for setting parameters of the mobile phone. In other words, the EEPROM stores some rewritable program parameters. Moreover, EEPROM stores the callee attribute data shown in FIG. 3, including: the callee's ID code 31 (e.g., name of the callee, urgency level, the department the callee works for, etc.), callee's ring settings 32 (e.g., ring tone, music, vibrations at various frequencies, and voice), callee's display settings 33 (e.g., text, code, image, icon, and picture), a message-to-caller 34, messages-to-callee 35, instructions-to-caller 36, information about the incoming calls 37, phonebook, IMEI number, phone lock code, parameters set by the user, and other user information and internal information of the mobile phone.

CPU controls the voice frequency unit and RF unit via control buses. The control signals include MUTE, LCDEN (LCD enable), LIGHT (light control), CHARGE (battery charging control), AFC (automatic frequency control), RXEN (reception enable), TxEN (transmission enable), SYNDAT (Frequency Synthesizer Channel data), SYNEN (Frequency Synthesizer enable), SYNCLK (Frequency Synthesizer clock), etc. These control signals are sent from the CPU to the voice frequency unit 42 and the RF unit 43 to control the operation of various parts and circuits therein.

Clock signals are provided to the logic control unit 43 and the CPU therein, and to the RF unit 41 and the frequency synthesizer therein. A RF unit clock provides a reference frequency to the frequency synthesizer. Operation of the whole system is synchronized by the clock signals.

When a mobile phone 4 is receiving a signal, the signal from a base station is received by an antenna. The received signal is processed by the RF receiving circuit 41, the logic control unit 43 and the voice frequency unit 42, and then is sent to a speaker.

When the mobile phone 4 is transmitting a signal, an audio signal is changed to an electrical signal by a microphone. The electrical signal is processed by the logic control unit 43, the voice frequency unit 42, and the radio frequency unit 41. The radio frequency signal is then sent to a base station via the antenna.

When a ringing signal is sent to the mobile phone 4, the mobile phone imitates an OFF HOOK signal and returns the imitated OFF HOOK signal to the caller. The mobile phone imitates answering the incoming call, but does not ring.

The mobile phone searches the callee attribute data shown in FIG. 3, and plays instructions-to-caller 36 to ask the caller to press a key. The instructions-to-caller 36 could be, for example: "Hello, I am in a meeting right now. If you need me to answer the call immediately, please press 1. If you can wait until I finish the meeting, please press 2. If you want to leave a message, please press 3. Thank you."

The caller presses a key according to his/her intent. The caller's input is then sent to the mobile phone. After receiving the input from the caller, the mobile telephone 4 saves the caller's selection as a part of the Callee's ID code 31. In response to the caller's input kept in the callee's ID code 31, the mobile phone 4 searches the callee attribute data shown in FIG. 3, specifically the callee's ring settings 32 (ring tones, music, vibrations at various frequencies or voice signals), callee's display settings 33 (text, code, image, icon, or picture), associated with the caller's selection, and sets the display and the ring accordingly.

For example: when the caller presses 1, the mobile phone 4 will set off short and quick rings or vibration, and emit red LED flashlight, urging the callee to answer the phone immediately. If the caller presses 2, the mobile phone 4 will set off long and slow rings or vibrations, and emit yellow LED flashlight, prompting the callee to answer the call after meeting. If caller presses 3, the mobile phone 4 will generate regular rings or vibrations, and emit blue LED flashlight, informing the callee that a message is being received. Minor hardware changes need to be made to the vibration unit so that it can vibrate at various frequencies, and to the LED flashlight of the mobile phone so that it can emit flashlight in different colors.

According to the ring signals and LED flashlight, the callee can respond to the call in three ways: (1) If the caller has an urgent matter and intends to talk to the callee immediately, the callee answers the call after several rings or vibrations; (2) If the caller can wait, the callee will not answer the call until the meeting is over; (3) If the caller wants to leave a message, then the mobile phone 4 will send out the greeting-to-caller 34, prompting the caller to leave a message. The caller's message is sent to the mobile phone 4, which stores the message as a message-to-callee 35. The callee could browse the incoming calls and stored message-to-callee 35.

In short, the present invention has effectively solved problems of the prior art, and provides convenience to family members, and office workers who share a phone number with others. It also helps mobile phone users to handle incoming calls according to their urgency level.

While the present invention has been described with reference to the certain embodiments, the invention should not be construed as limited to these embodiments. It shall be understood that all aspects of the present invention are not limited to the specific depictions, configurations or dimensions set forth herein which depend upon a variety of principles and variables. Various modifications in form and detail of the disclosed method and apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A method for communicating a caller's intent to a plurality of users sharing a phone number, the method comprising:
   (a) providing an intent-indicating apparatus comprising a microprocessor, a memory, a display screen and an input mechanism enabling users of a telephone to store personalized information in the memory and/or to select personalized information from the memory;
   (b) storing by a plurality of users or by any other party at least one of an alert preference or a personal display image preference as the personalized information, wherein each user is assigned an ID code associated with the personalized information;
   (c) answering an incoming call with an announcement requesting a caller to identify one of the users by ID code; and
   (d) in response to an ID code selected by the caller, triggering at least one of the playing of the alert preference stored as personalized information by the user associated with the ID code or the displaying on the display screen of the display image stored as personalized information by the user associated with the ID code;
   (e) storing by the intent-indicating apparatus the identification information of the user identified by the caller and the identification information of the caller for subsequent browsing by the user, such that when browsing the incoming call information stored for each incoming call, the user is capable of avoiding browsing stored information describing other incoming calls indicated by the respective callers as being intended for the other users;
wherein the identification information of the user includes at least one of the user ID or other text or code identifier;
wherein the identification information of the caller includes at least one of the phone number of the caller, the caller ID of the caller, the name of the caller, or any other text or code identifier;
wherein the incoming call information includes at least one of the identification information of the user, identification information of the caller, date of the incoming call, time of the incoming call, message-to-callee, or code indicating a context or level of urgency of the incoming call selected by the caller.

2. The method of claim 1, further comprising:
imitating an OFF HOOK signal by the intent-indicating apparatus when a caller calls one of the users.

3. The method of claim 1, further comprising:
individual ones of the users storing a personalized greeting and/or selecting from preconfigured greetings as a part of the personalized information, and associating the greetings with the associated user ID codes.

4. The method of claim 3, further comprising:
upon a caller calling and selecting the ID of one of the users, playing by the intent-indicating apparatus the greeting associated with the user, and asking the caller to leave a message to the called user; and
storing the message with identification of the called user.

5. The method of claim 1, wherein the alert preference setting is selected by a user storing personalized information and/or selected from preconfigured personalized information from stored files comprising ring tones, music, lights of varying colors, vibrations at different frequencies, or voice.

6. The method of claim 1, wherein the personal display image is selected from stored files comprising code, picture, icon, image, cartoon or text.

7. The method of claim 1 further comprising a function enabling a caller to indicate a context or urgency level, triggering an alarm by the apparatus, the alarm associated with the context or urgency level indicated by the caller.

8. The method of claim 7 wherein the alarm may be at least one of a ring tone, music, light of varying color, vibration of a certain frequency, or voice.

9. The method of claim 1, wherein for each of the two or more users, incoming call information describing an incoming call identified by a respective caller as intended for the user is stored in a data structure associated with the user.

10. The method of claim 9, wherein the data structure associated with the user stores the personalized information of the user.

11. The method of claim 1, wherein for each user the ID code associated with the personalized information stored for the user is a name of the user or any other text identifier.

12. The method of claim 1, wherein in response to receipt of the incoming call, the intent-indicating apparatus automatically answers the incoming call with the announcement requesting the caller to identify one of the users by ID code, and avoids making a determination of an identification of the caller, such that the alert preference that is played and/or the display image that is displayed are only based on the ID code selected by the caller without reference to the identification of the caller.

13. The method of claim 1, wherein the alert preference is a vibration and a frequency of the vibration is automatically selected from a plurality of preconfigured vibration frequencies based on a context or level of urgency of the incoming call selected by the caller.

14. The method of claim 13, wherein the context or level of urgency of the incoming call is selected by the caller in response to instructions played for the caller, wherein the instructions are prerecorded by the user identified by the caller.

15. The method of claim 14, wherein the instructions are stored at a recorder of the intent-indicating apparatus, with a code representing the instructions saved at the memory of the intent-indicating apparatus.

16. The method of claim 1, wherein attribute data is stored for the user, the attribute data including the ID code associated with the user, wherein the ID code includes at least one of a name or a department.

17. The method of claim 1, wherein attribute data is stored for the user, the attribute data including at least one of a instructions-to-caller, message-to-callee, or greeting-to-caller.

18. The method of claim 1, wherein attribute data is stored for the user, the attribute data including incoming call information, wherein the incoming call information includes at least one of the identification information of the user, identification information of the caller, date of the incoming call, time of the incoming call, message-to-callee, or code indicating a context or level of urgency of the incoming call selected by the caller.

19. The method of claim 5, wherein differences in frequencies include at least one of a difference in duration, recurrence, intensity, or pattern.

20. The method of claim 8, wherein a certain frequency comprises at least one of a certain duration, recurrence, intensity, and pattern.

21. The method of claim 1, further comprising:
in response to an ID code selected by the caller, triggering any number, combination, and sequence of alert preferences and display images associated with the ID code.

22. The method of claim 1, further comprising:
in response to an ID code selected by the caller, displaying on the display screen incoming call information;
wherein the incoming call information includes at least one of the identification information of the user, identification information of the caller, date of the incoming call, time of the incoming call, message-to-callee, or code indicating a context or level of urgency of the incoming call selected by the caller.

23. An apparatus for indicating a caller's intent to a plurality of users sharing a phone number, the apparatus comprising:
a microprocessor, a memory, a display screen and an input mechanism enabling users of a telephone to store personalized information in the memory and/or to select personalized information from the memory, the personalized information comprising at least a preference for an alert and/or a preference for a personal display image;
an interface to a telephone network; and
a programmed microprocessor providing:
a function associating an ID code with each user; a function enabling answering an incoming call with an announcement requesting a caller to identify one of the users by ID code;
a function enabling at least one of playing the alert preference stored as personalized information by the user associated with the ID code, playing the preconfigured alert preference associated with the ID code, displaying on the display screen the display image stored as personalized information by the user associated with the ID code, or displaying on the display screen the preconfigured display image associated with the ID code;

a function associating an ID code with the identification information of the user identified by the caller and the identification information of the caller for subsequent browsing by the user, such that when browsing the incoming call information stored for each incoming call, the user is capable of avoiding browsing stored information describing other incoming calls indicated by the respective callers as being intended for the other users;

wherein the identification information of the user includes at least one of the user ID or other text or code identifier;

wherein the identification information of the caller includes at least one of the phone number of the caller, the caller ID of the caller, the name of the caller, or any other text or code identifier;

wherein the incoming call information includes at least one of the identification information of the user, identification information of the caller, date of the incoming call, time of the incoming call, message-to-callee, or code indicating a context or level of urgency of the incoming call selected by the caller.

24. The apparatus of claim 23, further comprising a function enabling playing a stored greeting to a caller, the stored greeting recorded by the user or pre-recorded by a third party associated with an ID code selected by a caller.

25. The apparatus of claim 24, wherein the stored greeting requests the caller to leave a message to be stored by the apparatus in the memory associated with the identification of the of the user.

26. The apparatus of claim 23, wherein the alert preference may be at least one of a ring tone, music, light of varying color, vibration of a certain frequency, or voice.

27. The apparatus of claim 23, wherein the personal display image may be at least one of a code, picture, icon, image, cartoon or text.

28. The apparatus of claim 23 further comprising a function enabling a caller to indicate a context or urgency level, triggering an alarm by the apparatus, the alarm associated with the context or urgency level indicated by the caller.

29. The apparatus of claim 28, wherein the alarm may be at least one of a ring tone, music, light of varying color, vibration of a certain frequency, or voice.

30. The apparatus of claim 26, wherein a certain frequency comprises at least one of a certain duration, recurrence, intensity, and pattern.

31. The apparatus of claim 29, wherein a certain frequency comprises at least one of a certain duration, recurrence, intensity, and pattern.

* * * * *